United States Patent
Sammak et al.

(10) Patent No.: US 12,535,018 B2
(45) Date of Patent: Jan. 27, 2026

(54) OXY-COMBUSTION COMBINED CYCLE POWER PLANTS

(71) Applicant: GENERAL ELECTRIC TECHNOLOGY GMBH, Baden (CH)

(72) Inventors: Majed Sammak, Schenectady, NY (US); Baha Suleiman, Schenectady, NY (US); Alaaeldin Dawood, Schenectady, NY (US); Abdurrahman Khalidi, Schenectady, NY (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 18/291,406

(22) PCT Filed: Jul. 27, 2021

(86) PCT No.: PCT/US2021/071009
§ 371 (c)(1),
(2) Date: Jan. 23, 2024

(87) PCT Pub. No.: WO2023/009161
PCT Pub. Date: Feb. 2, 2023

(65) Prior Publication Data
US 2024/0369018 A1    Nov. 7, 2024

(51) Int. Cl.
| | |
|---|---|
| *F01K 23/10* | (2006.01) |
| *F01K 23/06* | (2006.01) |
| *F01K 23/12* | (2006.01) |
| *F01K 23/14* | (2006.01) |

(Continued)

(52) U.S. Cl.
CPC ............ *F01K 23/10* (2013.01); *F01K 23/06* (2013.01); *F01K 23/12* (2013.01); *F01K 23/14* (2013.01);

(Continued)

(58) Field of Classification Search
CPC . F02C 6/18; F01K 23/06; F01K 23/10; F01K 23/12; F01K 23/14; F01K 23/16; F01K 17/02
See application file for complete search history.

(56) References Cited

U.S. PATENT DOCUMENTS

| | | | |
|---|---|---|---|
| 5,724,805 A * | 3/1998 | Golomb | F02C 6/06 |
| | | | 60/39.463 |
| 6,442,941 B1 * | 9/2002 | Anand | F02C 7/32 |
| | | | 60/39.182 |

(Continued)

FOREIGN PATENT DOCUMENTS

| | | |
|---|---|---|
| DE | 102013223661 B4 | 5/2015 |
| JP | 2007170307 A | 7/2007 |

(Continued)

OTHER PUBLICATIONS

European Extended Search Report Issued for Application No. EP 21952100.2, dated Apr. 10, 2025 (10 pages).

(Continued)

*Primary Examiner* — Kyle Robert Thomas
(74) *Attorney, Agent, or Firm* — Armstrong Teasdale LLP

(57) ABSTRACT

An oxy-combustion combined cycle power plant that includes a gas turbine engine configured to combust natural gas and pure oxygen to generate power, and configured to discharge exhaust gas consisting essentially of carbon dioxide and water therefrom. A heat recovery system of the power plant includes a fluid path that is a closed loop, the fluid path channeling a working fluid that is carbon dioxide therethrough. A first heat exchanger is coupled along the fluid path, and a turbine is coupled downstream from the first heat exchanger along the fluid path. The first heat exchanger is configured to transfer heat from the exhaust gas to the working fluid, and the turbine is configured to use the heated (Continued)

working fluid, received from the first heat exchanger, to generate power.

18 Claims, 2 Drawing Sheets

(51) Int. Cl.
    *F01K 23/16*     (2006.01)
    *F01K 25/10*     (2006.01)
    *F02C 3/20*     (2006.01)
    *F02C 6/18*     (2006.01)

(52) U.S. Cl.
    CPC ............ *F01K 23/16* (2013.01); *F01K 25/103* (2013.01); *F02C 3/20* (2013.01); *F02C 6/18* (2013.01)

(56) References Cited

U.S. PATENT DOCUMENTS

| | | | |
|---|---|---|---|
| 6,672,075 B1 | 1/2004 | Sandu et al. | |
| 9,863,267 B2 * | 1/2018 | O'Dea | F23R 3/26 |
| 10,830,107 B2 * | 11/2020 | Qiao | F02C 6/00 |
| 2012/0073261 A1 | 3/2012 | Palmer et al. | |
| 2013/0269334 A1 * | 10/2013 | Sonwane | F02C 1/10 60/525 |
| 2013/0284121 A1 | 10/2013 | Kuivalainen et al. | |
| 2017/0058771 A1 | 3/2017 | Vandale et al. | |

FOREIGN PATENT DOCUMENTS

| | | |
|---|---|---|
| JP | 2016211569 A | 12/2016 |
| WO | 2019/002956 A1 | 1/2019 |
| WO | 2020/014238 A1 | 1/2020 |

OTHER PUBLICATIONS

Japanese Office Action issued for Application No. JP2024-500464, dated Jul. 16, 2025 (6 pages).

* cited by examiner

OXY-COMBUSTION COMBINED CYCLE POWER PLANTS

BACKGROUND

The present disclosure relates generally to oxy-combustion combined cycle power plants and, more specifically, oxy-combustion combined cycle power plants having integrated closed loop carbon dioxide cycles, including oxy-fuel combustion, for generating zero or near zero emissions.

At least some known conventional fossil fuel burning power generation systems generate power in a variety of ways For example, a gas turbine combustion engine may generate power by combusting fuels such as gasoline, natural gas, biogas, plant oil, diesel fuel, and the like. The combusted fuel drives a turbine cycle, which is connected to a generator for harnessing the power produced by the turbine cycle. However, combusting fuel creates emissions that are exhausted to the atmosphere, and controlling the emissions may be a costly and difficult process. Such combustion operations generate waste heat that may be used to generate additional power, such as with a bottoming steam Rankine cycle. A Rankine cycle typically includes a turbo generator, an evaporator/boiler, a condenser, and a liquid pump. However, water-based steam Rankine cycles can require bulky and complex equipment, may only be effective in certain conditions.

BRIEF DESCRIPTION

One aspect is an oxy-combustion combined cycle power plant. The oxy-combustion combined cycle power plant includes a gas turbine engine configured to combust natural gas and pure oxygen to generate power, and configured to discharge exhaust gas consisting essentially of carbon dioxide and water therefrom. A heat recovery system of the power plant includes a fluid path that is a closed loop, the fluid path channeling a working fluid that is carbon dioxide therethrough. A first heat exchanger is coupled along the fluid path, and a turbine is coupled downstream from the first heat exchanger along the fluid path. The first heat exchanger is configured to transfer heat from the exhaust gas to the working fluid, and the turbine is configured to use the heated working fluid, received from the first heat exchanger, to generate power.

Another aspect is an oxy-combustion combined cycle power plant. The oxy-combustion combined cycle power plant includes a gas turbine engine configured to combust fuel and oxygen to generate power, and configured to discharge exhaust gas comprising carbon dioxide therefrom. A heat recovery system of the power plant includes a fluid path that is a closed loop, the fluid path channeling a working fluid that is carbon dioxide therethrough. A first heat exchanger is coupled along the fluid path, and a turbine is coupled downstream from the first heat exchanger along the fluid path. The first heat exchanger is configured to transfer heat from the exhaust gas to the working fluid, and the turbine is configured to use the heated working fluid, received from the first heat exchanger, to generate power.

Yet another aspect is a zero emissions oxy-combustion combined cycle power plant. The oxy-combustion combined cycle power plant includes a gas turbine engine configured to combust natural gas and pure oxygen to generate power, and configured to discharge exhaust gas consisting essentially of carbon dioxide and water therefrom. A heat recovery system of the power plant includes a fluid path that is a closed loop, the fluid path channeling a working fluid that is carbon dioxide therethrough. A first heat exchanger is coupled along the fluid path, and a turbine is coupled downstream from the first heat exchanger along the fluid path. The first heat exchanger is configured to transfer heat from the exhaust gas to the working fluid, and the turbine is configured to use the heated working fluid, received from the first heat exchanger, to generate power. A recycle path extends between an outlet and an inlet of the gas turbine engine, the recycle path channeling at least a first portion of the exhaust gas from the outlet towards the inlet

DETAILED DESCRIPTION

The embodiments described herein relate to an oxy-combustion combined cycle power plant having integrated closed loop carbon dioxide cycles for producing zero or near zero emissions. The closed loop cycles include a closed oxy-fuel combustion gas turbine cycle and a supercritical carbon dioxide ($SCO_2$) cycle. The closed oxy-fuel combustion gas turbine cycle burns natural gas or mixture of natural gas and hydrogen with pure oxygen as oxidant instead of air. The combustion products are only carbon dioxide and water. Most of the water will be condensed in a flue gas condenser (FGC) leaving rich carbon dioxide in the flue gas. A major portion of the rich carbon dioxide flue gas will be recirculated back into the compressor of the combustion gas turbine cycle, while a smaller portion of the carbon dioxide rich flue gas will be sent for carbon dioxide compression for storage and/or utilization. Meanwhile, the $SCO_2$ cycle receives waste heat from the flue gas to heat the working fluid within the $SCO_2$ cycle. In some embodiments, a recuperator may be used to utilize any remaining heat in the flue gas prior to water condensation in the FGC. Accordingly, this power plant creates zero emissions while maintaining high gas turbine performance. In addition, this power plant provides a compact design as compared to other gas turbine cycles that involve carbon capture and water-based heat recovery.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
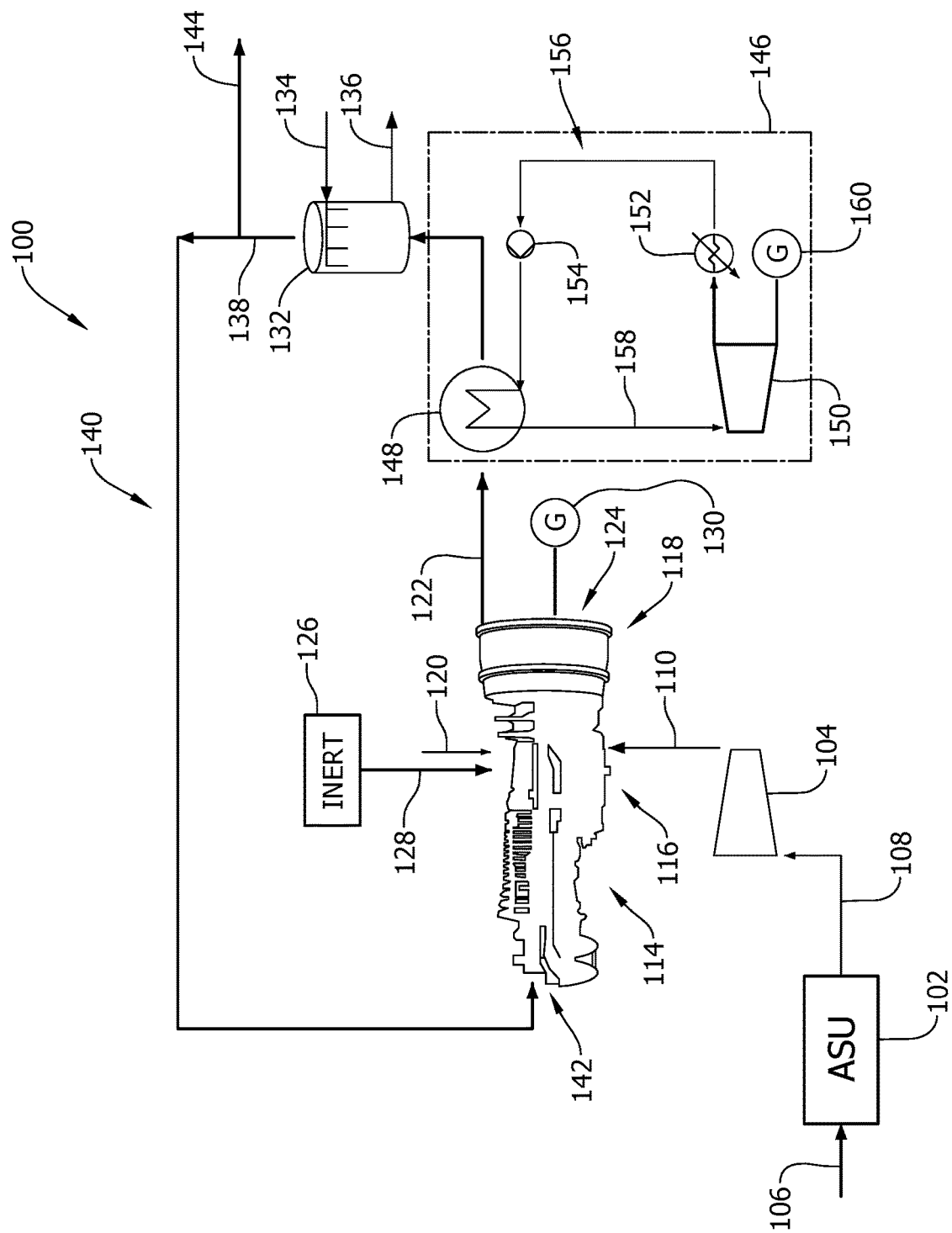
FIG. 1 is a schematic illustration of an exemplary oxy-combustion combined cycle power plant.

FIG. 1 is a schematic illustration of an exemplary oxy-combustion combined cycle power plant 100. Oxy-combustion combined cycle power plant 100 includes an air separation unit 102 and an oxygen compressor 104. Air separation unit 102 receives air 106, separates oxygen from air 106 for providing a supply of pure oxygen 108 to oxygen compressor 104. Oxygen compressor 104 compresses pure oxygen 108, and channels compressed oxygen 110 towards a gas turbine engine 112 as an oxidizer. Byproducts of the air separation, such as nitrogen, can be stored and/or used for other applications. As used herein, "pure oxygen" refers to a product stream having an oxygen content of at least 90% by weight, at least 95% by weight, or at least 99% by weight of the product stream.

Gas turbine engine 112 includes a compressor section 114, a combustor section 116, and a turbine section 118. Combustor section 116 receives fuel 120 and compressed oxygen 110 for combustion purposes. Fuel 120 may be any hydrocarbon fuel that enables gas turbine engine 112 to function as described herein. Non-limiting examples of fuel include heavy hydrocarbons, natural gas, methane, and ethanol. In one embodiment, fuel 120 is natural gas (i.e., primarily methane ($CH_4$)), and the reaction product of fuel 120 and oxygen 110 ($O_2$), in the form of exhaust gas 122 discharged from an outlet 124 of turbine section 118, is carbon dioxide, water, and trace amounts of carbon monoxide and oxygen. Thus, exhaust gas 122 is substantially free of oxides of nitrogen and/or other potentially noxious gases resulting from combustion of fuel and air.

In some embodiments, an inert gas injection unit 126 is coupled in flow communication with combustor section 116. Inert gas injection unit 126 selectively provides inert gas 128 to combustor section 116 for use in combustion with fuel 120 and oxygen 110. For example, helium, neon, argon, xenon, or any other suitable inert gas, may be added to the air-fuel mixture within combustor section 116 as desired and/or required to adjust an operating parameter (e.g., sound speed) of the combustion operation.

As described above, turbine section 118 combusts fuel 120 and oxygen 110 to generate exhaust gas 122. Combusting fuel 120 and oxygen 110 drives turbine section 118, which is coupled to a generator 130 for storing power generated by gas turbine engine 112. Exhaust gas 122 is discharged at an elevated temperature, and waste heat therefrom may be used to generate additional power, as will be described in more detail below.

In the illustrated example, a condenser 132 is positioned downstream from turbine section 118 to receive exhaust gas 122 therein. Condenser 132 receives cooling liquid 134 therein that is then circulated within condenser 132 for interacting with exhaust gas 122. An example cooling liquid includes, but is not limited to including, water. The cooling liquid circulated within condenser 132 cools exhaust gas 122 to a temperature that is below its saturation temperature, with respect to water vapor, and hence causes a condensation of at least a portion of the water vapor content. Thus, condensed water 136 and purified carbon dioxide 138 are separated from exhaust gas 122, and each component may then be discharged from condenser 132 in respective streams.

Carbon dioxide 138 discharged from condenser 132 is channeled along a recycle path 140 that extends from condenser 132 to gas turbine section 118. More specifically, carbon dioxide 138 is channeled from condenser 132 to an inlet 142 of compressor section 114 for use in gas turbine engine 112 as the working fluid. The carbon dioxide 138 facilitates regulating the temperature of combustor section 116 and, when combined with the inert gas, provides a mixed fluid that simulates the properties of air in a traditional air-fuel combustion gas turbine. In some embodiments, a portion 144 of carbon dioxide 138 is drawn from recycle path 140 to be compressed and/or stored for use in another application. A recovery system may be installed downstream and in flow communication with portion 144 of carbon dioxide 138. The recovery system may be used to collect the inert gas contained therein and recycle it towards gas turbine engine 112.

Oxy-combustion combined cycle power plant 100 also includes a waste heat recovery system 146 thermally coupled to gas turbine engine 112. For example, waste heat recovery system 146 includes a heat exchanger 148, a turbine expander 150, a heater 152, and a pump 154 all coupled along a closed loop fluid path 156 that channels a working fluid 158 therethrough. In one example, working fluid 158 is carbon dioxide, and waste heat recovery system 146 is operable to heat the carbon dioxide to a supercritical level prior to entering turbine expander 150.

For example, heat exchanger 148 is thermally coupled along both recycle path 140 and fluid path 156 to facilitate heat transfer between exhaust gas 122 and working fluid 158. Working fluid 158 discharged from heat exchanger 148 in its supercritical state is then channeled towards turbine expander 150. Working fluid 158 drives turbine expander 150, which is coupled to a generator 160 for storing power generated by turbine expander 150. The power from generator 160 may be used to provide power to operate example parasitic loads of the oxy-fuel gas turbine cycle, such as those from air separation unit 102, oxygen compressor 104, and/or compressor section 114.

Working fluid 158 discharged from turbine expander 150 is channeled through heater 152 and pump 154 before being recirculated through heat exchanger 148. As noted above, fluid path 156 is a closed loop such that working fluid 158 is continuously recirculated therein without releasing working fluid 158 to an ambient environment. Similarly, recycle path 140 is a generally closed loop, wherein any components of exhaust gas 122 are not vented to the ambient environment, but rather are adapted or stored for use in other applications. Accordingly, oxy-combustion combined cycle power plant 100 is capable of generating power without releasing potentially noxious emissions, such as oxides of nitrogen, to the ambient environment.

Figure 2:
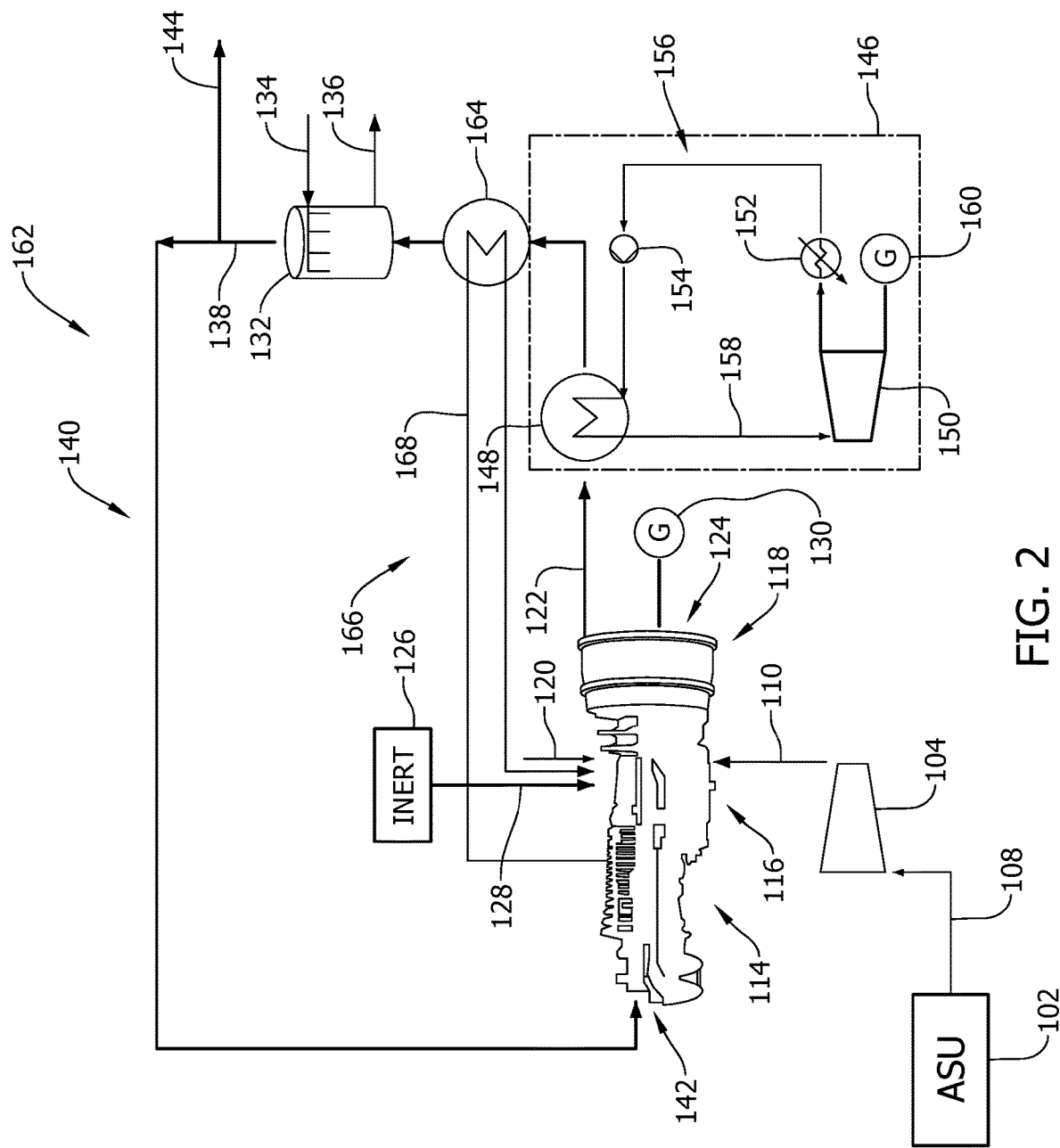
FIG. 2 is a schematic illustration of an alternative oxy-combustion combined cycle power plant.

FIG. 2 is a schematic illustration of an alternative oxy-combustion combined cycle power plant 162. In the illustrated example, oxy-combustion combined cycle power plant 162 includes a heat exchanger 164 coupled along recycle path 140 and a bleed path 166 extending from compressor section 114 to combustor section 116 of gas turbine engine 112. As shown, heat exchanger 164 is positioned between heat exchanger 148 and condenser 132 along recycle path 140. Thus, heat exchanger 164 receives exhaust gas 122 that has been cooled due to heat transfer that occurs between exhaust gas 122 and working fluid 158 at heat exchanger 148. Heat exchanger 164 facilitates transferring heat between exhaust gas 122 and compressor bleed fluid 168 extracted from compressor section 114 and channeled within bleed path 166. Accordingly, any remaining waste heat to be recovered from exhaust gas 122 may be transferred to compressor bleed fluid 168, and the heated compressor bleed fluid 168 is then channeled towards combustor section 116. Thus, the thermal efficiency of oxy-combustion combined cycle power plant 100 is improved.

The embodiments described herein relate to the integration of two closed loop carbon dioxide cycles, a closed direct oxy-fuel combustion gas turbine cycle and a supercritical carbon dioxide waste heat recovery cycle. The integration of these two cycles provides high performance power generation capabilities while creating virtually zero emissions of noxious gases that are typically encountered with other types of combustion operations. Other advantages include the production of useful byproducts, such as nitrogen, water, and carbon dioxide, a compact design as compared to other gas turbine cycles that involve carbon capture and waste heat recovery. Accordingly, this power plant creates zero emissions while maintaining high gas turbine performance.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Exemplary embodiments of oxy-combustion combined cycle power plants that use carbon dioxide as a working fluid are described above in detail. The systems and methods described herein are not limited to the specific embodiments described herein, but rather, steps of the methods may be utilized independently and separately from other steps described herein. For example, the methods described herein are not limited to practice with industrial gas turbine engines as described herein. Rather, the exemplary embodiment can be implemented and utilized in connection with any application that where zero emissions power production is desired.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. An oxy-combustion combined cycle power plant comprising:
    a gas turbine engine including a compressor section, a combustor section, and a turbine section, the gas turbine engine configured to combust natural gas and pure oxygen to generate power, and configured to discharge exhaust gas consisting essentially of carbon dioxide and water therefrom;
    a heat recovery system comprising:
        a fluid path that is a closed loop, the fluid path channeling a working fluid that is carbon dioxide therethrough;
        a first heat exchanger coupled along the fluid path; and
        a turbine coupled downstream from the first heat exchanger along the fluid path, wherein the first heat exchanger is configured to transfer heat from the exhaust gas to the working fluid, and wherein the turbine is configured to use the heated working fluid, received from the first heat exchanger;
    a condenser coupled downstream from the first heat exchanger of the heat recovery system for receiving the exhaust gas, the condenser discharging carbon dioxide that is mixed with an inert gas within the gas turbine engine and forming a working fluid for the gas turbine engine; and
    a recycle path extending between and fluidly coupling the condenser and an inlet of the compressor section of the gas turbine engine, the recycle path configured to provide the carbon dioxide discharged by the condenser to the compressor section of the gas turbine engine.

2. The oxy-combustion combined cycle power plant in accordance with claim 1 further comprising an air separation unit configured to receive air, to separate oxygen from the air to generate pure oxygen, and to channel the pure oxygen to the gas turbine engine for combustion with the natural gas.

3. The oxy-combustion combined cycle power plant in accordance with claim 1 further comprising a second heat exchanger coupled along the recycle path and a bleed path channeling compressor bleed air therethrough, wherein the first heat exchanger is coupled upstream from the second heat exchanger, wherein the second heat exchanger is configured to transfer heat from the exhaust gas to the compressor bleed air.

4. The oxy-combustion combined cycle power plant in accordance with claim 1 wherein the condenser is configured to separate the water from the exhaust gas.

5. The oxy-combustion combined cycle power plant in accordance with claim 1, wherein the first heat exchanger is adapted to heat the carbon dioxide in the fluid path to a supercritical level.

6. The oxy-combustion combined cycle power plant in accordance with claim 1 further comprising an inert gas injection unit configured to provide the inert gas, other than carbon dioxide, to the gas turbine engine for use in combustion with the natural gas and pure oxygen.

7. The oxy-combustion combined cycle power plant in accordance with claim 1, wherein the heat recovery system further includes:
    a heater coupled downstream from the turbine along the fluid path; and
    a pump coupled downstream from the heater, and upstream from the first heat exchanger, the pump coupled along the fluid path.

8. An oxy-combustion combined cycle power plant comprising:
    a gas turbine engine including a compressor section, a combustor section, and a turbine section, the gas turbine engine configured to combust fuel and oxygen to generate power, and configured to discharge exhaust gas comprising carbon dioxide therefrom; and,
    a heat recovery system comprising:
        a fluid path that is a closed loop, the fluid path channeling a working fluid that is carbon dioxide therethrough;
        a first heat exchanger coupled along the fluid path; and
        a turbine coupled downstream from the first heat exchanger along the fluid path, wherein the first heat exchanger is configured to transfer heat from the exhaust gas to the working fluid, and wherein the turbine is configured to use the heated working fluid, received from the first heat exchanger, to generate power;
    a condenser coupled downstream from the first heat exchanger of the heat recovery system for receiving the exhaust gas, the condenser discharging carbon dioxide that is mixed with an inert gas within the gas turbine engine and forming a working fluid for the gas turbine engine; and
    a recycle path extending between and fluidly coupling the condenser and an inlet of the compressor section of the gas turbine engine, the recycle path configured to provide the carbon dioxide discharged by the condenser to the compressor section of the gas turbine engine.

9. The oxy-combustion combined cycle power plant in accordance with claim 8, wherein the gas turbine engine is configured to combust fuel and oxygen to generate the exhaust gas that is substantially free of oxides of nitrogen.

10. The oxy-combustion combined cycle power plant in accordance with claim 8 further comprising an air separation unit configured to receive air, to separate oxygen from the air to generate pure oxygen, and to channel the pure oxygen to the gas turbine engine for combustion with the natural gas.

11. The oxy-combustion combined cycle power plant in accordance with claim 8 further comprising a second heat exchanger coupled along the recycle path and a bleed path channeling compressor bleed air therethrough, wherein the first heat exchanger is coupled upstream from the second heat exchanger, wherein the second heat exchanger is configured to transfer heat from the exhaust gas to the compressor bleed air.

12. The oxy-combustion combined cycle power plant in accordance with claim 8 wherein the condenser is configured to separate the water from the exhaust gas.

13. The oxy-combustion combined cycle power plant in accordance with claim 8, wherein the first heat exchanger is adapted to heat the carbon dioxide in the fluid path to a supercritical level.

14. The oxy-combustion combined cycle power plant in accordance with claim 8 further comprising an inert gas injection unit configured to provide the inert gas, other than carbon dioxide, to the gas turbine engine for use in combustion with the natural gas and pure oxygen.

15. A zero emissions oxy-combustion combined cycle power plant comprising:
   a gas turbine engine including a compressor section, a combustor section, and a turbine section, the gas turbine engine configured to combust natural gas and pure oxygen to generate power, and configured to discharge exhaust gas consisting essentially of carbon dioxide and water therefrom;
   a heat recovery system comprising:
      a fluid path that is a closed loop, the fluid path channeling a working fluid that is carbon dioxide therethrough;
      a first heat exchanger coupled along the fluid path; and
      a turbine coupled downstream from the first heat exchanger along the fluid path, wherein the first heat exchanger is configured to transfer heat from the exhaust gas to the working fluid, and wherein the turbine is configured to use the heated working fluid, received from the first heat exchanger, to generate power;
   a condenser coupled downstream from the first heat exchanger of the heat recovery system for receiving the exhaust gas, the condenser discharging carbon dioxide that is mixed with an inert gas within the gas turbine engine and forming a working fluid for the gas turbine engine; and
   a recycle path extending between and fluidly coupling the condenser and an outlet and an inlet of the compressor section of the gas turbine engine, the recycle path configured to provide the carbon dioxide discharged by the condenser to the compressor section of the gas turbine engine.

16. The zero emissions oxy-combustion combined cycle power plant in accordance with claim 15 further comprising a storage unit configured to receive a second portion of the exhaust gas discharged from the gas turbine engine.

17. The zero emissions oxy-combustion combined cycle power plant in accordance with claim 15 further comprising a second heat exchanger coupled along the recycle path and a bleed path channeling compressor bleed air therethrough, wherein the first heat exchanger is coupled upstream from the second heat exchanger, wherein the second heat exchanger is configured to transfer heat from the exhaust gas to the compressor bleed air.

18. The zero emissions oxy-combustion combined cycle power plant in accordance with claim 15, wherein the first heat exchanger is adapted to heat the carbon dioxide in the fluid path to a supercritical level.

* * * * *